United States Patent
Lahijani

(10) Patent No.: US 6,177,518 B1
(45) Date of Patent: Jan. 23, 2001

(54) BLENDS OF FLUOROPLASTICS WITH POLYETHERKETONEKETONE

(75) Inventor: Jacob Lahijani, Wilmington, DE (US)

(73) Assignee: E. I. du Pont de Nemours and Company, Wilmington, DE (US)

(*) Notice: Under 35 U.S.C. 154(b), the term of this patent shall be extended for 0 days.

(21) Appl. No.: 09/094,942

(22) Filed: Jun. 15, 1998

Related U.S. Application Data

(60) Provisional application No. 60/053,749, filed on Jul. 25, 1997.

(51) Int. Cl.$^7$ ............ C08L 27/12; B29D 24/00; B29C 47/06
(52) U.S. Cl. ........ 525/199; 525/153; 525/326.2; 525/418; 524/544; 524/545; 524/546; 428/421; 428/36.9; 264/171.27; 264/514
(58) Field of Search .............. 525/199, 326.2, 525/418, 153; 524/544, 545, 546

(56) References Cited

U.S. PATENT DOCUMENTS

| | | | |
|---|---|---|---|
| 4,777,214 | 10/1988 | Petersen | 525/146 |
| 4,816,556 | 3/1989 | Gay et al. | 528/176 |
| 4,986,511 | * 1/1991 | Irby et al. | 251/1.3 |

FOREIGN PATENT DOCUMENTS

| | | | |
|---|---|---|---|
| 0 320 894 | 6/1989 | (EP) | C08L/27/18 |
| WO 98/13422 | 4/1998 | (WO) | C08L/27/12 |

OTHER PUBLICATIONS

Chemical Abstracts, vol. 126, No. 16, Apr. 21, 1997, Columbus, Ohio, Abstract No. 213137, XP002082975, *Abstract* JP 09 020883 A (NTN Toyo Bearing Co Ltd, Japan).

Chemical Abstracts, vol. 126, No. 3, Jan. 20, 1997, Columbus, Ohio, Abstract No. 32732, XP002082976, *Abstract* JP 08 267613 A (NTN Toyo Bearing COL, Ltd.; Sumitomo Chemical Co.).

H.–J Hendriock, PTFE Micropowders, *Kunstoffe German Plastics*, 76, 920–926, 1986 and Translation pp. 63–66.

Kirk–Othmer, Encyclopedia of Chemical Technology, 4$^{th}$ Ed., Published by John Wiley & Sons, 11, 637–639, (1994).

* cited by examiner

*Primary Examiner*—James J. Seidleck
*Assistant Examiner*—Olga Asinovsky

(57) ABSTRACT

Compositions of melt-flowable fluoroplastic and poly(ether ketone ketone) are provided, wherein the either the fluoroplastic or the poly(ether ketone ketone) is the matrix polymer and the other polymer is the dispersed phase, to provide improved properties to the matrix polymer.

10 Claims, No Drawings

BLENDS OF FLUOROPLASTICS WITH POLYETHERKETONEKETONE

This application claims the benefit of provisional application Ser. No. 60/053749, filed Jul. 25, 1997.

FIELD OF THE INVENTION

This invention relates to blends of fluoroplastics and polyetherketoneketone having improved properties.

BACKGROUND OF THE INVENTION

Fluoroplastics which are fabricable by melt flow at temperatures above their melting points have a wide range of utilities because of their chemical inertness and high melting temperature. These utilities could be broadened if such properties as room temperature toughness, high temperature physical properties such as heat distortion temperature and/or permeability could be improved. The use of additives in the fluoroplastic in an attempt to achieve such improvement suffers from one or more problems of incompatibility with the fluoroplastic, resulting in deterioration of desired properties, and difficulty in uniformly incorporating the additive into the fluoroplastic.

SUMMARY OF THE INVENTION

It has been found that incorporation of varying amounts of polyetherketoneketone, commonly known as PEKK, into melt-flowable fluoroplastics imparts surprising improvements in properties to the fluoroplastic. Another aspect of the present invention is the incorporation of the fluoroplastic into the PEKK to cause surprising improvement in properties of the PEKK. In this aspect, the fluoroplastic is dispersed in PEKK as the matrix instead of the PEKK being dispersed in the fluoroplastic as in the first-mentioned embodiment. Thus, the present invention is a composition comprising 5 to 95 wt % melt-flowable fluoroplastic and complementally, to total 100 wt %, 95 to 5 wt % PEKK.

DETAILED DESCRIPTION OF THE INVENTION

In one embodiment of the present invention, the melt-flowability of the fluoroplastic enables it to be fabricated by melt extrusion, including injection molding. As such, the fluoroplastic can have a melt flow rate (MFR) in the range of 1 to 100 g/10 min determined in accordance with ASTM D-1238 at the temperature which is standard for the fluoroplastic. The fluoroplastic is non-elastomeric, i.e. the stress-strain curve for the fluoroplastic exhibits a yield point, and upon further stretching of the fluoroplastic, there is little recovery of strain (stretch), e.g. less than 20%, upon release of the stretching force. Examples of melt-fabricable fluoroplastics include the group of well known fluoropolymers comprising tetrafluoroethylene (TFE) copolymers, particularly the copolymers of TFE with one or more comonomers selected from perfluoroolefins having 3–8 carbon atoms, preferably hexafluoropropylene (HFP), and perfluoro(alkyl vinyl ether) (PAVE) with alkyl groups having 1–5 carbon atoms, preferably 1–3 carbon atoms, most preferably 2–3 carbon atoms. Such copolymers have sufficient concentration of comonomer to reduce the melting temperature of the copolymer significantly below that of TFE homopolymer. Preferred melt-fabricable fluoroplastics include TFE/HFP (typically referred to as FEP), TFE/PAVE (typically referred to as PFA), and TFE/HFP/PAVE. The aforesaid TFE copolymers can also contain minor amounts of units derived from other comonomers, including polar-functional monomers that introduce polar groups along the polymer chain, usually at the end of pendant side groups, when copolymerized into the polymer. Fluoroplastics other than the perfluorinated copolymers mentioned above can also be used, such as copolymers of TFE or chlorotrifluoroethylene (CTFE) with ethylene, and TFE/HFP/vinylidene fluoride copolymer (THV). The processing of the fluoroplastic at temperature above its melting point indicates that the fluoroplastic has crystallinity. The fluoroplastic used in the present invention may also be amorphous, however, in which case, the processing of the fluoroplastic is at a high temperature that the PEKK will be flowable as though molten during the processing.

In another embodiment of the present invention, a portion of the melt-fabricable fluoroplastic is replaced by polytetrafluoroethylene (PTFE) micropowder. PTFE micropowder is a tetrafluoroethylene homopolymer or modified homopolymer which has a considerably lower molecular weight than the normal high melt viscosity PTFE, which enables the micropowder by itself to be melt flowable, having a melt flow rate within the range described for the melt-fabricable fluoroplastics. The high molecular weight of the normal PTFE is characterized by a molecular weight (Mn) of at least 2,000,000 and a melt viscosity of at least $10^8$ Pa.s at 380° C., this melt viscosity being so high that the PTFE does not flow in the molten state, requiring special non-melt-fabrication techniques, including paste extrusion for the fine powder type of PTFE and compression molding for the granular type of PTFE. In contrast, the molecular weight (Mn) of PTFE micropowder will usually be within the range of 50,000 to 700,000, and the melt viscosity of the micropowder will be 50 to $1 \times 10^5$ Pa•s as measured at 372° C. in accordance with the procedure of ASTM D-1239-52T, modified as disclosed in U.S. Pat. No. 4,380,618. Preferably the melt viscosity of the PTFE micropowder is 100 to $1 \times 10^4$ Pa•s at 372° C. PTFE micropowder is described further in Kirk-Othmer, The Encyclopedia of Chemical Technology, $4^{th}$ Ed., pub. by John Wiley & Sons (1994) on pp 637–639 of Vol. 11, and in the article H. -J Hendriock, "PTFE Micropowders", Kunstoffe German Plastics, 76, pp. 920–926 (1986). These publications describe the micropowder as being obtained by polymerization or by irradiation degradation of the high molecular weight (high melt viscosity) PTFE. Polymerization directly to the micropowder is disclosed for example in PCT WO 95/23829, wherein the micropowder is referred to as low melt viscosity PTFE. Although the PTFE micropowder is melt flowable, it is not melt fabricable by itself because the resultant product has no practical strength due to the low molecular weight of the PTFE micropowder. Thus, the beading obtained in the melt flow rate test from which the melt viscosity is determined is brittle such that it breaks upon the slightest flexure.

When a portion of the melt-fabricable fluoroplastic is replaced by PTFE micropwder, at least 10% by weight of the total fluoroplastic will be the melt-fabricable fluoroplastic, preferably at least 20 wt %, the remainder being the PTFE micropowder. Surprisingly, the PTFE micropowder imparts increased strength to articles molded from the fluoroplastic/PEKK blend, even though the PTFE micropowder has no strength by itself as described above.

The PEKK component is a copolymer of diphenyl ether and benzene dicarboxylic acid halides, preferably terephthalyl (T) or isophthaloyl (I) halides, usually chlorides, and mixtures thereof, such as disclosed in U.S. Pat. Nos. 3,062,205, 3,441,538, 3,442,857, 3,516,966, 4,704,448, and 4,816,556, preferably having an inherent viscosity of at least 0.4 measured on a 0.5 wt % solution in concentrated sulfuric acid at 30° C. The PEKK generally has a melting point of at least 300° C. Typically, the PEKK contains both T and I units in a ratio of 90:10 to 30:70, and more typically 80:20 to 60:40. As the proportion of T units decrease and I units increase, the crystallinity of the PEKK diminishes, until at 60:40, the PEKK crystallizes so slowly that it resembles an amorphous polymer, except that it will exhibit a melting point.

With respect to the combination of fluoroplastic and PEKK forming compositions of the present invention, in a general sense, the preferred composition has at least 25 wt % of the melt-flowable fluoroplastic. For specific results, the proportion of the fluoroplastic will vary. One of the improvements which a relatively small amount of PEKK imparts to the fluoroplastic is improved cut-through resistance which is especially valuable in the use of fluoroplastic for insulation coating or jacketing of insulated wire. In this embodiment, the PEKK content of the composition will be 5 to 25 wt %, preferably 10 to 20 wt %. While the PEKK is incompatible with the fluoroplastic as indicated by the PEKK being present as discrete particles (domains) dispersed in the fluoroplastic matrix forming the insulation or jacketing, the electrical properties and tensile elongation of the insulation and jacketing does not suffer.

Another improvement which a relatively small amount of PEKK imparts to the fluoroplastic is improved high temperature resistance to distortion under load. This is especially valuable for applications in which the fluoroplastic forms a structural member, such as baskets for carrying articles through exposure to chemical processing at high temperatures. Unfortunately, fluoroplastics tend to creep and distort at temperatures as low as 60 to 100° C. PEKK imparts much greater resistance to creep and distortion at elevated temperatures than would be expected from the amount of PEKK used. This greater resistance to creep and distortion can be measured as increased heat distortion temperature in accordance with ASTM D648 using 264 psi (1816 MPa) load. Dispersion of PEKK in fluoroplastic can provide blends which have heat distortion temperatures (HDT) greater than 100° C., and even greater than 140° C., enabling the fluoroplastic to have a higher service temperature, without detracting from the chemical inertness of the fluoroplastic. In this embodiment, the PEKK content of the composition can be 5 to 30 wt %, preferably 10 to 30 wt %, and more preferably 15 to 25 wt %.

In still another embodiment, at higher PEKK content for the composition, e.g. 40 to 50 wt %, wherein the PEKK is still the dispersed phase in the fluoroplastic composition, the resultant composition exhibits remarkable creep resistance, i.e. resistance to cold flow. Instead of delaminating as might be expected, the composition has physical integrity, so as to be useful in structural applications providing the improved performance of dimensional integrity. This embodiment is demonstrated is especially valuable in pipe lining.

In still another embodiment, wherein the PEKK is the matrix polymer component of the composition, the incorporation of dispersed fluoroplastic therein provides for improved impermeability to organic fluid and improved toughness. Fluoroplastic by itself has high impermeability to such hydrocarbon fluids as fuel as compared to the relatively high permeability of PEKK to such fluid. Dispersion of a relatively small amount of the fluoroplastic, e.g. 5 to 30 wt %, greatly improves the impermeability of the PEKK (the resultant blend) to such fluid and improves the toughness of the PEKK as well. Thus, coextruded tubing of a fluoroplastic inner layer and a layer of the blend (dispersion of the fluoroplastic in the PEKK) of the present invention is highly useful in applications for transporting such hydrocarbon fluid as fuel both on board motorized vehicles and in stationary applications.

The fluoroplastic and PEKK components can be melt blended as part of the extrusion process or can be premixed, followed by melt blending at temperature at which both resins are molten. Generally, the melt blending temperature will be at least 300° C. Under this condition, the PEKK or the fluoroplastic, as the case may be, becomes uniformly dispersed as fine particles (domains) in the component which becomes the matrix. The resultant extrudate can be the final molded article, such as in the case of an injection molded article or an extruded tube, sheet or coating, or can be chopped into molding granules for subsequent melt processing into the article desired.

The compositions of the present invention can contain other ingredients such as pigments for coloring the composition or fillers, such as mica, glass, carbon, or aramid, in fibrous or other particulate form. The PEKK aids in dispersing the filler in the fluoroplastic matrix. When filler is present, the amount present will be 0.5 to 30 wt % based on the combined weight of PEKK, fluoroplastic and filler.

EXAMPLES

The general procedure for melt blending to form blends of the present invention as described in the following Examples was as follows: The fluoroplastic and PEKK were fed in the proportions desired to a twin-screw extruder equipped with high shear screws for melt blending under vaccuum to remove any gas that may be generated. The maximum extruder temperature is reported in the Examples. The resulting melt blend was extruded as strands, cooled and chopped up into pellets for injection and compression molding at temperatures of 330 to 370° C. for testing. The melt flow rates (MFR) disclosed in the Examples are typical for the respective fluoropolymers as indicated in the commercial product literature. The PEKK used in the Examples is made by the process disclosed in U.S. Pat. No. 4,816,556 (Gay et al.)

Example 1

In this experiment, the fluoroplastic was TEFLON® PFA fluoropolymer resin grade 350 (MFR 2 g/10 min at 372° C.) and the PEKK contained T and I units in a 80/20 ratio. The extruder temperature used was 360° C. Blends containing 5 to 30 wt % of the fluoroplastic dispersed in the PEKK matrix were made and tested for high temperature distortion (test previously described) and tensile modulus, with the results shown in the following tables:

TABLE 1

| | HDT | |
| --- | --- | --- |
| Wt % PFA | Wt % PEKK | HDT - ° C. |
| 100 | 0 | 61.5 |
| 95 | 5 | 70.1 |
| 90 | 10 | 81.0 |
| 80 | 20 | 132.0 |
| 70 | 30 | 151.0 |
| 0 | 100 | 162.0 |

These results show that only a relatively small proportion of the PEKK dispersant in the fluoroplastic has a much greater effect on increasing HDT than would be expected. For example, only 30 wt % of the PEKK was needed to raise the HDT almost 90% of the difference in HDT between pure PFA and pure PEKK.

TABLE 2

Tensile Modulus (D638)

| Wt % PFA | Wt % PEKK | Tensile Mod.- ksi* (MPa) |
|---|---|---|
| 100 | 0 | 40 (276) |
| 95 | 5 | 49.1 (339) |
| 90 | 10 | 93 (642) |
| 80 | 20 | 193 (1332) |
| 70 | 30 | 247 (1704) |
| 0 | 100 | 530 (3657) |

*1 ksi = 1000 psi

This table shows that the tensile modulus of PFA is quite low as compared to PEKK, but that with only 30 wt % of the blend being PEKK, more than 50% of the difference between these moduli is gained by the 70/30 blend. Additional blends were made in which the PEKK content was increased from 30 wt % to 95 wt % in approximately 10 wt % increments.

Similar results are obtained when resin grade 340 PFA (MFR 13 g/10 min at 372° C.) is substituted for the 350 resin grade PFA.

Example 2

Blends were made in which the PEKK contained T and I units in a 60/40 ratio was the PFA was the 340 grade. In these experiments the PEKK contained about 10 wt % of $TiO_2$ filler, based on the weight of the PEKK plus filler, and the PEKK/filler blend constituted 70 to 80 wt % of the total composition. The temperature of the twin screw extruder was 370° C. The 80 wt % composition was tested for tensile modulus, which was 471 ksi (3250 MPa) as compared to 495 ksi (3416 MPa) for the PEKK composition by itself and 64 ksi (442 MPa) for the PFA by itself. The incorporation of the PFA into the PEKK resulted in an unexpectedly small reduction in the tensile modulus of the PEKK composition, while imparting improved chemical resistance to the overall composition.

Blends similarly made, but containing 40 wt % of the PFA, also exhibited an unexpectedly high tensile modulus of 441 ksi (3043 MPa).

Example 3

This experiment repeated the experiments of Example 2 except that the PFA formed the blend matrix, by constituting 60 to 80 wt % of the total composition. The twin screw extruder temperature was 370° C. Blends containing 60 and 80 wt % of the PFA, thereby forming the matrix of the blend, exhibited unexpectedly high tensile moduli of 296 ksi (2042 MPa) and 222 ksi (1532 MPa), respectively. Articles made from these blends exhibit much greater strength that articles made solely from the PFA resin and chemical resistance approaching that of the pure PFA resin.

Example 4

This experiment was similar to the experiment of Example 2 except that the composition of the melt blend was 60 wt % of the PEKK, 5 wt % $TiO_2$, and 35 wt % of the PFA. Similarly higher than expected tensile modulus (318 ksi, 2194 MPa) was obtained.

Example 5

The PEKK composition of Example 2 was used and the fluoroplastic was TFE/HFP copolymer (TEFLON® FEP fluoropolymer resin grade 100, MFR 7 g/10 min at 372°). Blends containing 5 to 30 wt % of this fluoroplastic and 95 to 70 wt % of the PEKK were prepared using a twin screw extruder operating at 370° C. The tensile modulus of the FEP by itself is 50 ksi (345 MPa). The tensile moduli of the blends having 5, 10 and 20 wt % of the FEP were determined and all were greater than 436 ksi (3008 MPa) obtained for the 20 wt % blend, which is unexpectedly high.

Blends similarly made but containing 60, 80, and 90 wt % of the FEP, thereby forming the matrix of the blend, exhibited unexpectedly high tensile moduli of 310 ksi (2139 MPa), 185 ksi (1277 MPa), and 141 ksi (973 MPa), respectively.

Example 6

A blend of 80 wt % TEFZEL® ETFE fluoropolymer grade 280 (MFR 4 g/10 min at 297° C.) and 20 wt % of the PEKK used in Example 1 was prepared in the twin screw extruder at a temperature of 370° C. and tested for tensile modulus. The TEFZEL fluoroplastic by itself exhibited a tensile modulus of 186 ksi (1283 MPa), and the blend exhibited a tensile modulus of 263 ksi (1815 MPa), which is greater than the increase that would have been expected from the tensile modulus of the PEKK. A similar result was obtained when the PEKK of Example 2 was used; the 80/20 blend exhibited a tensile modulus of 260 ksi (1794 MPa).

Example 7

This Example shows the unexpectedly high tensile modulus of blends of fluoroplastic and PEKK when the fluoroplastic is a combination of melt-fabricable and melt-flowable, not melt-fabricable fluoroplastics. The PEKK used was that of Example 1, tensile modulus of 530 ksi, the melt-fabricable fluoroplastic was TEFLON® PFA fluoropolymer grade 440 HP (MFR 13 g/10 min at 372°) exhibiting a tensile modulus of 80 ksi (552 MPa), and the melt flowable, not melt-fabricable fluoroplastic (PTFE micropowder) was ZONYL® fluoroadditive grade MP 1600 (MFR 17 g/10 min at 372° C.) exhibiting no tensile strength (zero tensile modulus), because the tensile test bars break upon clamping in the tensile testing machine. The results are shown in Table 3.

TABLE 3

| | | | Tensile Modulus | |
|---|---|---|---|---|
| Wt % PFA | Wt % MP1600 | Wt % PEKK | ksi | MPa |
| 5 | 50 | 45 | 360 | 2484 |
| 10 | 50 | 40 | 350 | 2415 |
| 20 | 50 | 30 | 340 | 2346 |
| 30 | 50 | 20 | 260 | 1794 |
| 40 | 50 | 10 | 180 | 1242 |

Table 3 shows that even only a small proportion of PEKK doubles the tensile modulus of the PFA considered by itself, and that the MP 1600 fluoroadditive which has no tensile modulus, does not detract from the tensile strengthening of the blend. Surprisingly, the MP1600 fluoroadditive, which has no tensile strength, can constitute a substantial proportion of the blend with PEKK, wherein the blend has high tensile modulus. This provides a utility for the MP 1600 fluoroadditive in molded articles, in contrast to prior utilities for this fluoropolymers as a particulate solid lubricant in liquid media or as a component in a supported coating composition. The PTFE micropowder also imparts improved chemical resistance and lubricity to the blend.

Example 8

This Example shows the improved creep resistance (reduced creep) of blends of the present invention. The fluoropolymer used was the PFA of Example 1 and the PEKK used was that of Example 1. The creep of test specimens of the blends was measured by DMA (Dynamic Mechanical Analyzer) at 100° C. using a 500 g load. The creep is the increase in length of the specimen as a percent of the original length (% elongation)

|  |  | % Elongation | |
| --- | --- | --- | --- |
| Wt % PFA | Wt % PEKK | Initial | (10,000 hours) |
| 100 | — | 1.83 | 3.04 |
| — | 100 | 0.11 | 0.16 |
| 95 | 5 | 1.48 | 2.39 |
| 90 | 10 | 0.97 | 1.51 |
| 80 | 20 | 0.55 | 0.81 |
| 70 | 30 | 0.37 | 0.77 |

Table 3 shows that as little as 5 wt % PEKK reduces the initial elongation by 19% and the long term elongation (creep) by 21%. The presence of 20 wt % PEKK in the blend decreases creep by almost 400%.

What is claimed is:

1. Composition comprising 5 to 95 wt % non-elastomeric melt-flowable fluoroplastic having crystallinity and complementally to total 100 wt %, 95 to 5 wt % polyetherketoneketone.

2. The composition of claim 1 wherein said polyetherketoneketone is dispersed in a matrix of said fluoroplastic.

3. The composition of claim 1 wherein said fluoroplastic is dispersed in a matrix of said polyetherketoneketone.

4. The composition of claim 1 and additionally containing filler.

5. The composition of claim 1 wherein the amount of said polyetherketoneketone present is 5 to 30 wt %.

6. The composition of claim 1 wherein the amount of said polyetherketoneketone present is 40 to 50 wt %.

7. The composition of claim 1 wherein the amount of said fluoroplastic present is 5 to 30 wt %.

8. The composition of claim 1 wherein said fluoroplastic is melt fabricable fluoroplastic.

9. The composition of claim 1 wherein said fluoroplastic comprises at least 10 wt % of melt-fabricable fluoroplastic, the remainder to total 100 wt % of said fluoroplastic being polytetrafluoroethylene micropowder.

10. Process comprising coextruding a composite tubing having an inner layer of melt fabricable fluoroplastic and an outer layer of the composition of claim 1.

* * * * *